Patented Oct. 17, 1939

2,176,144

UNITED STATES PATENT OFFICE 2,176,144

METHOD OF CURING MEAT

Meyer Moskowitz, New York, N. Y., and Harry Meisel, North Bergen, N. J., assignors to Corn Products Refining Company, New York, N. Y., a corporation of New Jersey No Drawing. Application February 4, 1939, Serial No. 254,688

6 Claims. (Cl. 99—159)

This invention relates to the curing of meats and, more particularly, to meat curing operations involving the use of dextrose.

It has long been customary in the meat packing industry to utilize sucrose as an ingredient in meat curing compositions and under recent developments methods have been devised whereby dextrose may be substituted for sucrose for this purpose. However, it has been noted that certain meats such as bacon, for example, when produced by a curing process involving the substitution of dextrose for sucrose, will lose the characteristic red color when fried and will darken to an undesirable degree.

The principal object of the present invention is to provide an improvement on the dextrose methods of curing meat whereby the cured meat will not lose its color when it is fried.

The known dextrose methods of curing meat, on which the present invention is an improvement, are applicable to either the dry cure process or the wet cure process and the following examples illustrate a typical series of operations according to these known methods.

Dry cure bacon process

1. A composition comprising three pounds sodium chloride, two pounds dextrose hydrate and one-quarter pound sodium nitrate is spread over 100 pounds of pork bellies.

2. The salted meat is then packed in vertical batches consisting of 60–80 salted bellies and placed in a refrigerator for twenty-one days at a temperature of approximately 35–45° F.

3. At the end of this period the meat is removed from the refrigerator, placed in a washing tank and covered with water at a temperature of between 60–80° F. for about fifteen minutes.

4. The water is then removed and the washing operation repeated three to four times.

5. The meat is then smoked for ten to twenty hours, the smoke temperature being 120–140° F.

Wet cure bacon process 1. 100 pounds of pork bellies are soaked for thirty days at a temperature of 35–45° F. in a pickle comprising 5 gallons of 17% sodium chloride solution, one pound of dextrose hydrate and one-quarter pound of sodium nitrate.

2. At the end of this period the meat is removed, subjected to repeated washing operations and smoked, as in the dry cure process above described.

The present invention comprises, in brief, the treatment of either the wet or dry cured bacon meat, after a series of washing operations, with hydrogen peroxide. It has been found that if a dextrose-cured meat is so treated, the resulting product will not darken when it is fried. The reason for this is not fully understood but the practicability of the improvement has been proven empirically.

The invention is illustrated in the following example which, it will be understood, is purely illustrative and not by way of limitation.

Example 100 pounds of fresh pork bellies were covered with a curing composition comprising 3 pounds sodium chloride, 2 pounds dextrose hydrate and one-quarter of a pound of sodium nitrate. The salted meat was then packed in vertical batches, each batch consisting of 60–80 salted bellies and placed in a refrigerator for twenty-one days at a temperature of approximately 35 to 45° F. At the end of this period the meat was placed in a washing tank and covered with water at a temperature of between 60–80° F. for about fifteen minutes. The water was then removed and the washing operation repeated several times. The washed meat was then soaked for 15 minutes at between 60°–80° F. in water containing 0.45 pound of 30 volume (9%) hydrogen peroxide per 100 pounds of bacon. The liquid was then decanted off and given a further fifteen minute wash in plain water (60°–80° F.). The water from this wash was then removed and the cured bacon was smoked with hickory sawdust smoke at a temperature of 120°–140° F. for 15 hours. The cured bacon, when sliced and fried, did not lose its characteristic red color.

Similar results were obtained by treating, in like manner, bacon meat cured by the wet cure process and cured by processes in which the curing compositions were slightly different, for example, a curing composition consisting of salt, dextrose hydrate and both sodium nitrate and sodium nitrite.

It will be seen, therefore, that the present invention is applicable to any dextrose curing process in which the resulting product turns dark on being fried.

The amount and strength of the hydrogen peroxide solution may, of course, be varied without departing from the scope of the invention. However, it is preferred to use an amount corresponding substantially to 0.02 to 0.06 pounds of pure hydrogen peroxide for each 100 pounds of meat. Likewise the desired result may be attained by adding to the wash water a hydrogen peroxide producing per salt such as sodium peroxide, potassium peroxide, calcium peroxide, sodium per carbonate, potassium per carbonate, and the like. For example, instead of using 0.45 pound of 30 volume (9%) hydrogen peroxide, as specified in the above example, there could be added 0.08 pound of sodium peroxide powder and then 0.03 pound of 18° Baumé hydrochloric acid to obtain by chemical reaction the desired dilute solution of hydrogen peroxide.

It is the intention to cover all variations and modifications within the scope of the appended claims.

We claim:

1. In the method of curing meat in which the fresh meat is treated with a curing composition containing salt and dextrose, and then subjected to a washing operation, the improvement which consists in treating the meat, following the washing operation, with hydrogen peroxide.

2. In the method of curing meat in which the fresh meat is treated with a curing composition containing salt and dextrose, and then subjected to a washing operation, the improvement which consists in treating the meat, following the washing operation, with hydrogen peroxide in amounts substantially corresponding to 0.02 to 0.06 pound of pure hydrogen peroxide per 100 pounds of meat.

3. In the method of manufacturing bacon in which the fresh bacon meat is treated with a curing composition containing dextrose, then subjected to a washing operation and then smoked, the improvement which consists in treating the meat, following the washing operation, with a solution containing hydrogen peroxide.

4. In the method of manufacturing bacon in which the fresh bacon meat is treated with a curing composition containing dextrose, then subjected to a washing operation and then smoked, the improvement which consists in treating the meat, following the washing operation, with a solution containing hydrogen peroxide in amounts substantially corresponding to 0.45 pound of 30 volume (9%) hydrogen peroxide per 100 pounds of meat.

5. Method of manufacturing bacon which comprises covering 100 parts of fresh bacon meat with a curing composition containing substantially 3 parts salt, 2 parts dextrose and 0.25 part sodium nitrate, storing the salted meat for not substantially less than 21 days at a temperature of substantially 40° F.; washing the meat in a series of washing operations, soaking the washed meat in a solution containing hydrogen peroxide in an amount substantially corresponding to 0.45 pound of 30 volume (9%) hydrogen peroxide per 100 pounds of meat, then subjecting the treated meat to a further washing operation and smoking the same.

6. Method of making bacon which comprises soaking the fresh bacon meat for not substantially less than thirty days in a solution containing salt, dextrose and sodium nitrate while maintaining the temperature of the solution at approximately 38° F., then washing the meat in a series of washing operations, soaking the washed meat in a solution containing hydrogen peroxide in an amount substantially corresponding to 0.45 pounds of 30 volume (9%) hydogen peroxide per 100 pounds of meat, then subjecting the treated meat to a further washing operation and smoking the same.

MEYER MOSKOWITZ.
HARRY MEISEL.